US006384583B1

(12) United States Patent
Lestician

(10) Patent No.: US 6,384,583 B1
(45) Date of Patent: May 7, 2002

(54) POWER POD CONTROLLER SYSTEM

(75) Inventor: Guy J. Lestician, Township of Lower Smithfield, County of Monroe, PA (US)

(73) Assignee: Power Saver Designs, Inc., East Stroudsburg, PA (US)

( * ) Notice: Subject to any disclaimer, the term of this patent is extended or adjusted under 35 U.S.C. 154(b) by 0 days.

(21) Appl. No.: 09/781,079

(22) Filed: Feb. 9, 2001

Related U.S. Application Data

(63) Continuation-in-part of application No. 09/644,132, filed on Aug. 23, 2000.

(51) Int. Cl.[7] .............................. G05F 1/70; H02M 1/12

(52) U.S. Cl. ........................... 323/276; 363/39; 363/50; 323/205; 361/118

(58) Field of Search ................................ 323/274, 275, 323/276, 205, 208; 361/118, 119, 124; 363/39, 40, 44, 49, 50

(56) References Cited

U.S. PATENT DOCUMENTS 4,630,163 A * 12/1986 Cpper et al. ................ 361/118
5,351,181 A * 9/1994 Brennen et al. .......... 363/40 X
5,384,696 A * 1/1995 Moran et al. ................. 363/40

* cited by examiner

*Primary Examiner*—Jessica Han
(74) *Attorney, Agent, or Firm*—Kenneth P. Glynn, Esq.

(57) ABSTRACT

The present invention system includes:

(a) in-parallel connection to an incoming power supply of a facility including a hot line and a neutral line, and at least one ground. There are components connected between the hot line and the neutral line in the following order (b) front metal oxide varistor(s) line transient voltage surge suppressor having to suppress undesired power spikes;(c) at least one capacitor of predetermined capacitance;(d) at least two chokes in the form of inductor/metal oxide varistor transformers;(e) at least a second capacitor of its own predetermined capacitance;(f) back metal oxide varistor(S) having a predetermined capability. In preferred embodiments, the metal oxide varistor may be a plurality of varistors in parallel; (g) a failure indicator circuit connected to the transient voltage surge suppressor, including at least one relay, one voltage-surge responsive switch and one indicator signalling component.

18 Claims, 5 Drawing Sheets

POWER POD CONTROLLER SYSTEM

REFERENCE TO RELATED APPLICATION

This application is a continuation-in-part of copending U.S. patent application Ser. No. 09/644,132, filed on Aug. 23, 2000, and entitled "Electricity Pod Controller Device", by the same inventor herein.

BACKGROUND OF THE INVENTION

1. Field of the Invention

The present invention relates to conservation of electrical energy consumption by commercial, industrial, residential and all other energy consumers using retrofitted control devices which are attached at the incoming breakers to a facility and operate to increase efficiencies in a three stage process. Additionally, the present invention system includes lightning suppression and transient voltage surge suppression (TVSS) features, and failure detection circuitry.

2. Information Disclosure Statement

The following references are examples of the prior art relating to control of electrical energy consumption:

U.S. Pat. No. 4,163,218 relates to an electronic control system for controlling the operation of a plurality of electrical devices which are energized from AC power lines which includes a single, central unit connected to the power lines, which further includes a central transceiver means for transmitting an encoded oscillating signal of one frequency onto the power lines, a central encoding means for encoding the oscillating signal with an encoded signal in synchronization with the frequency of the AC power for selective control of electrical devices, and a central control means connected to the encoding means for selecting the electrical device to be controlled and its desired state. The invention further includes unitary switch units respectively interconnected between power lines and each electrical device being operative for both local and centralized control of the electrical device with the local control and the centralized control placing the electrical device in respective opposite states from each other, each switch unit including a switch transceiver means for receiving the encoded oscillating signal from the power lines, a switch decoding means coupled to the switch transceiver means for detecting the encoded signal, a switch control means connected to the switch decoding means for setting the selected electrical devices to the desired state, and a local control means for selectively locally operating the electrical device independently of the central unit and placing the electrical device in a state opposite from that which it was placed by the central unit.

U.S. Pat. No. 4,845,580 describes a spike elimination circuit for A.C. and D.C. power sources which comprises two gas tube and/or two semiconductor voltage limiting devices before a Bandpass Filter. The Bandpass Filter consists of 2 capacitors to ground an inductor in series with the line. The spike eliminator can be portable, mobile, or hard wired for the protection of home controls and electronics, telecommunications, commercial and industrial controls and the computer field and others.

U.S. Pat. No. 4,870,528 describes a surge suppressor which comprises a first series circuit having a first inductance and a first alternating voltage limiter, including at least a first capacitance and a bidirectionally conductive rectifying circuit for charging the first capacitance, coupled between first and second input terminals for limiting surge currents and voltage excursions coupled to first and second load output terminals. The first alternating voltage limiter further comprises a sensing circuit for sensing at least one of the charging current supplied to and the voltage developed across the first capacitance. An auxiliary energy storage circuit and a normally open switching device responsive to the sensing circuit are provided for coupling the auxiliary energy storage circuit across the first capacitance during high energy surge conditions.

U.S. Pat. No. 5,105,327 describes a power conditioner for AC power lines which has a choke and capacitor coupled in series across the power lines. The choke comprises a coil terminating in a line, with the line looped back through the coil. The power lines are thereby balanced to provide greater operating efficiency. Capacitors and transient suppressors (e.g., varistors) are used for transient suppression and power factor correction.

U.S. Pat. No. 5,420,741 relates to an arrangement for obtaining flux rate information in a magnetic circuit including passive means connected across a flux rate sensor for implementing control of said flux rate. The passive means being a tuned magnetic flux rate feedback sensing and control arrangement wherein impedance is tuned and the energy loss characteristic is adjustable. The selection of inductance and capacitance values provides tuning and the selection of resistance affects the energy loss characteristics.

U.S. Pat. No. 5,432,710 is directed to an energy supply system for supplying, in system interconnection, power at a power receiving equipment from a power plant and power generated by a fuel cell to a power consuming installation, and supplying heat generated by the fuel cell to a heat consuming installation. This system includes an operation amount computing device for computing an amount of operation of the fuel cell to minimize an equation y=aXL+bXM+cXN, in response to an energy demand of the power consuming installation and heat consuming installation. A control device controls the fuel cell to satisfy the amount of the operation computed. The system supplies energy in optimal conditions with respect to the cost borne by an energy consumer, consumption of primary energy, and release of environmental pollutants. Energy is effectively used from the standpoint of the energy consumer and a national point of view.

U.S. Pat. No. 5,436,513 relates to an information handling system which is described as having a power supply and having a switching circuit that switches a plurality of energy sources between series and parallel couplings. Associated with the switching circuit is a voltage level detecting circuit for monitoring the voltage level of the energy sources. A processor for controlling the information handling system responds to the voltage level detecting circuit and in the event of a low voltage condition, the processor activates the switching circuit to switch the energy sources and from a series to a parallel coupling. Alternatively, the processor responds to other inputs or conditions for actuating the switching circuit.

U.S. Pat. No. 5,459,459 is directed to an algorithm for implementation in a meter register and a reading device. In the one embodiment, the invention enables selecting a display table to be read from the register, updating the billing read date and time in the register, reversing the order in which load profile data is transmitted from the register to the reader, specifying the number of load profile intervals to be read from the register, and specifying the number of intervals to skip when reading from the register.

U.S. Pat. No. 5,462,225 relates to an apparatus and method for controlling energy supplied to a space conditioning load and for overriding a load control operation in response to measuring certain space temperatures within a closed environment. The load control apparatus includes a control device connected to an electrical distribution network and to a space/conditioning load and a temperature sensing device connected to the control device. The control device conducts a load shedding operation to control distribution of electrical energy to the space conditioning load in response to command signals supplied by a remote command center. The temperature sensing device operates to override the load shedding operation by outputting a control override signal to the control device in response to sensing certain space temperatures within the closed environment. If the temperature control device is connected to an air conditioning system, the temperature sensing device causes the control device to terminate the load shedding operation prior to expiration of a selected time period in response to measuring a space temperature that exceeds a maximum space temperature limit. In contrast, if the temperature control device is connected to a forced air heating system, the temperature sensing device causes the control device to terminate the load shedding operation when a measured space temperature drops below a minimum space temperature limit. The maximum space temperature limit is greater than the control temperature setpoint of a thermostat that controls the space conditioning operations, whereas the minimum space temperature limit is less than the control temperature setpoint.

U.S. Pat. No. 5,483,672 relates to a communication system, where a communication unit may conserve source energy when it is inactive in the following manner. The control channel is partitioned into a predetermined number of windows and a system window which are transmitted on the control channel in a round robin manner. When the communication unit registers with the communication system, it is assigned to a window group. The communication unit then monitors only the system window to determine whether the window group that its been assigned to is also assigned to one of the predetermined number of windows. When the window that has been assigned to the window group is being transmitted to the control channel, the communication unit activates to monitor that window. Once the window is no longer being transmitted, the communication unit deactivates until the system window is being transmitted or the window assigned to the window group is being transmitted.

U.S. Pat. No. 5,495,129 relates to an electronic device for multiplexing several loads to the terminals of a source of alternating electrical energy. The source of alternating electrical energy is coupled by electromagnetic flux to the loads by using primary excitation windings and connects to the terminals of the source of alternating electrical energy and secondary windings respectively corresponding to the number of loads. The secondary windings are at least partially coupled to the primary winding and are each connected to the terminals of a load. The coupling is inhibited by auxiliary winding which are each totally coupled with the secondary winding. The inhibition function is controlled in order to inhibit all the magnetic couplings except for one and this particular one changes as a function of the respective load to be coupled to the source of alternating electrical energy.

U.S. Pat. No. 5,512,831 relates to a system for testing electrochemical energy conversion and storage devices includes means for sensing the current from the storage device and varying the load across the storage device in response to the current sensed. The system is equally adaptable to batteries and fuel cells. Means is also provided to sense system parameters from a plurality of locations within the system. Certain parameters are then stored in digital form for archive purposes and certain other parameters are used to develop control signals in a host processor.

U.S. Pat. No. 5,517,188 is directed to a programmable identification apparatus, and associated method, includes a transceiver and a transponder. The transponder is powered by the energy of a transceiver transmit signal generated by the transceiver and includes a programmable memory element. A coded sequence which uniquely identifies the transponder is stored in the programmable memory element and, when the transponder is powered, the transponder generates a transponder signal which includes the coded sequence stored in the programmable memory element, once modulated by circuitry of the transponder. When the transceiver transmit signal generated by the transceiver circuitry is of certain signal characteristics, the coded sequence stored in the programmable element is erased, and a substitute coded sequence, which also forms a portion of the transceiver transmit signal, is stored in the programmable memory element. Storage of the coded sequence in the programmable memory element is, hence, effectuated merely by application of a transceiver transmit signal of certain characteristics to the transponder.

U.S. Pat. No. 5,528,123 measures the total line current in a power cord which is used to energize both a power factor corrected system and non-power factor corrected AC loads. The power factor control loop of the power factor corrected system is then driven to correct the power factor of total line current in the power cord ideally to approach unity.

U.S. Pat. No. 5,640,314 relates to a symmetrical ac power system which provides a balanced ac output, whose maximum voltage with respect to a reference ground potential is one-half the ac output voltage, and which is derived from a single phase ac source through the use of an isolation transformer having a center-tapped secondary winding. The center tap is connected to the output power load circuit as a ground reference potential with respect to the symmetrical ac output so as to constitute the reference ground potential for the power supply and load. Since symmetrical ac power is applied to the load by the system, reactive load currents, other power artifacts, EMI and RFI emissions and other interference and noise components ordinarily resulting from the application of conventional ac power to the load are reduced or eliminated by appearing as equal inversely phased signal elements which cancel one another. In order to maximize the performance of the symmetrical power system, the isolation transformer has a bifilar-wound secondary winding.

U.S. Pat. No. 5,646,458 describes a UPS (uninterruptible power system) which includes an UPS power conditioning unit that provides conditioned AC power to a critical load. The UPS power conditioning unit includes a variable speed drive that operates in response to AC utility power or to a standby DC input by providing a motor drive signal. The UPS power conditioning unit further includes a motor-generator that operates in response to the motor drive output by providing the conditioned AC power to the critical load. In response to an outage in the utility AC power, standby DC power is provided by a standby DC power source that includes a variable speed drive and a flywheel motor-generator connected to the variable speed drive. Both the UPS power conditioning unit and the standby DC power source are initially operated in response to the utility AC power, the flywheel motor-generator storing kinetic energy in a rotating flywheel. When an outage occurs, the rotating flywheel continues to operate the flywheel motor-generator of the standby DC power source, causing the production of AC power which is rectified and provided as standby DC power to operate the variable speed drive of the UPS power conditioning unit until either the utility AC power outage is over or a standby emergency generator is brought on line.

U.S. Pat. No. 5,880,677 relates to a system that monitors and controls electrical power consumption that will be retrofitted to a typical consumer electrical power arrangement (typical arrangement-electrical feed line from a provider, a meter, a circuit breaker and individual input wiring to a plurality of electrical devices, appliances and outlets). The system includes a control unit which receives information from an electromagnetic pickup device from which real time electrical consumption is determined over very short periods of time. The control unit has a main data processing and storage processor for retaining information and it may include a communication microprocessor for sending signals to corresponding modules. The electromagnetic pickup device uniquely measures the electromagnetic flux emanating at each output wire from each of the individual circuit breakers in a breaker box. The modules have filters which release electrical power to the individual electrical devices, appliances and outlets at a controlled, economic rate.

U.S. Pat. No. 5,892,667 describes a symmetrical ac power system which provides a balanced ac output, whose maximum voltage with respect to a reference ground potential is one-half the ac output voltage, and which is derived from a single phase ac source through the use of an isolation transformer having a center-tapped secondary winding. The center tap is connected to the output power load circuit as a ground reference potential with respect to the symmetrical ac output so as to constitute the reference ground potential for the power supply and load. Since symmetrical ac power is applied to the load by the system, reactive load currents, other power artifacts, EMI and RFI emissions and other interference ad noise components ordinarily resulting from the application of conventional ac power to the load are reduced or eliminated by appearing as equal inversely phased signal elements which cancel one another. In order to maximize the performance of the symmetrical power system, the isolation transformer has a bifilar-wound secondary winding.

U.S. Pat. No. 6,009,004 discloses a new single-phase passive harmonic filter for one or more nonlinear loads. The filter improves the total system performance by drastically reducing the line side current harmonics generated by nonlinear loads. The filter includes two inductive portions across one of which is connected a tuning capacitor. The parallel combination of one inductive portion with the tuning capacitor forms a series tuned filter configuration while the second inductive portion is used for harmonic attenuation. A shunt capacitor is employed for shunting higher order harmonic components. A single-phase passive voltage regulator provides the needed voltage bucking to prevent over voltage at the load terminals of the filter. The filter provides an alternate path for the harmonic currents generated by nonlinear loads. The over voltage caused by the increased capacitive reactance is controlled by either capacitor switching or by the use of the passive voltage regulator or a combination of the two. Capacitor switching is dependent upon load conditions.

U.S. Pat. No. 6,014,017 describes a method and an apparatus for power factor correction for a non-ideal load, which is supplied from a mains power supply, by a compensation device which is electrically connected in parallel with the load and has a pulse converter with at least one capacitive store. A transfer function space vector is calculated as a function of a determined mains power supply voltage space vector, a mains power supply current space vector, a compensator current space vector and of an intermediate circuit voltage which is present on the capacitive store. As a result of which the pulse converter generates a compensator voltage space vector on the mains power supply side as a function of the intermediate circuit voltage. A compensator current space vector, that keeps the undesirable reactive current elements away from the mains power supply, is thus obtained via a coupling filter that is represented as a compensator inductance.

U.S. Pat. No. 6,058,035 describes a method wherein after starting the input of a switching signal to a booster circuit whose boosting rate is changeable in accordance with the duty ratio of the inputted switching signal and calculating the output power of an invertor circuit, which is connected to the subsequent stage of the booster circuit, from the output current of the invertor circuit, the target voltage after boosting by the booster circuit is obtained based on the output power. If the actual output voltage of the booster circuit is lower than the target voltage, the duty ratio of the above switching signal is increased, and if higher, the duty ratio of the above switching signal is decreased.

Notwithstanding the above prior art, there are no teachings or suggestions that would render the present invention anticipated or obvious.

SUMMARY OF THE INVENTION

The present invention is a power pod controller system, which includes connection for connecting the device in parallel with an incoming power supply to a facility, i.e. a home, factory, office, institution, etc.; there is an electricity pod controller device, which includes a first stage component, a second state component and a third stage component.

The first stage is adapted to recognize electromagnetic interference, and to respond thereto by suppressing live transient voltage surges, and thus includes at least one line transient voltage surge suppressor (TVSS). The TVSS may be one or more metal oxide varistors and is preferably a plurality of in-parallel metal oxide varistors.

The second stage component includes at least one variable inductor to regulate the total harmonics distortion (THD) and thus enhance power factor correction. This would include chokes (transformers) and storage. The third stage component includes hardware to provide power to maintain phase regulation to incoming power, thus, to maintain true phase relationship between voltage and current at times of increased power demands.

The third stage component includes at least one power storage and discharge element.

In addition, there is failure indicator circuitry connected to the electricity pod controller device and specifically to the surge suppressor(s) for indicating failures and for setting off appropriate responses, e.g. alarms, back ups, etc. at remote locations.

In some embodiments, the present invention is arranged so that the first stage component, second stage component and third stage component operate in a single phase. In other embodiments, there are at least two sets of components, each set having a first stage component, a second stage component and a third stage component, such that the device operates as a two phase device. In yet other embodiments, the present invention system with the electricity pod controller device has three sets of components, each set having a first stage component, a second stage component and a third stage component, wherein the device operates as a three phase device.

More specifically, preferred embodiments of the present invention power pod controller system include:

(a) connecting means for connection to an incoming power supply of a facility, for connection in parallel, including a hot line and a neutral line, and at least one ground, with a number of electricity pod controller device components connected between the hot line and the neutral line. They are connected in the following order travelling in a direction away from the connections;

(b) at least one front metal oxide varistor line transient voltage surge suppressor having a predetermined capability to suppress undesired power spikes ("front" is used to mean closer to the connection and "back" is used to mean further away from the connection);

(c) at least one capacitor of predetermined capacitance;

(d) at least two chokes in the form of inductor/metal oxide varistor transformers;

(e) at least a second capacitor of its own predetermined capacitance;

(f) at least one back metal oxide varistor having a predetermined capability. In preferred embodiments, the front metal oxide varistor is a plurality of varistors in parallel. It has been discovered that a plurality of smaller varistors having the same total capability as one larger varistor responds more quickly than one large varistor. For similar reasons, it is preferred that the back metal oxide varistor be a plurality of varistors in parallel. However, single large varistors may be used without exceeding the scope of the present invention.

In addition, there is failure indication circuitry which is connected in series with the TVSS(s), which function as supervision and alarm devices. In some preferred embodiments, a plurality of lightning arresters are likewise connected to the TVSS(s).

In some embodiments, the components (b) through (f) above are arranged for operation as a single phase device, while in other embodiments, the components are duplicated therein to form two connected sets thereof and are arranged for operation as a two phase device. In yet other embodiments, at least a portion of component (e) is duplicated.

In those embodiments where three phase operation is desired, the electricity pod controller device components (b) through (d) are at least triplicated therein and (e) and (f) are at least duplicated therein to form three connected sets thereof and are thus arranged for operation as a three phase device.

The system of the present invention may further include at least one indicator lamp connection and lamp at the device itself, which is wired so as to illuminate when the device is functional and to not illuminate when the device is non-functional. This optional feature is different from the aforesaid failure indicators which are connected directly with the TVSS(s) and are usually used for remote signalling, such as a supervisor's workstation, or to a host server which will broadcast the alert signal to a plurality of locations to simultaneously warn supervisors, managers and even smart response systems.

BRIEF DESCRIPTION OF THE DRAWINGS

The present invention should be more fully understood when the specification herein is taken in conjunction with the drawings appended hereto, wherein.

DETAILED DESCRIPTION OF THE PRESENT INVENTION

Figure 1:
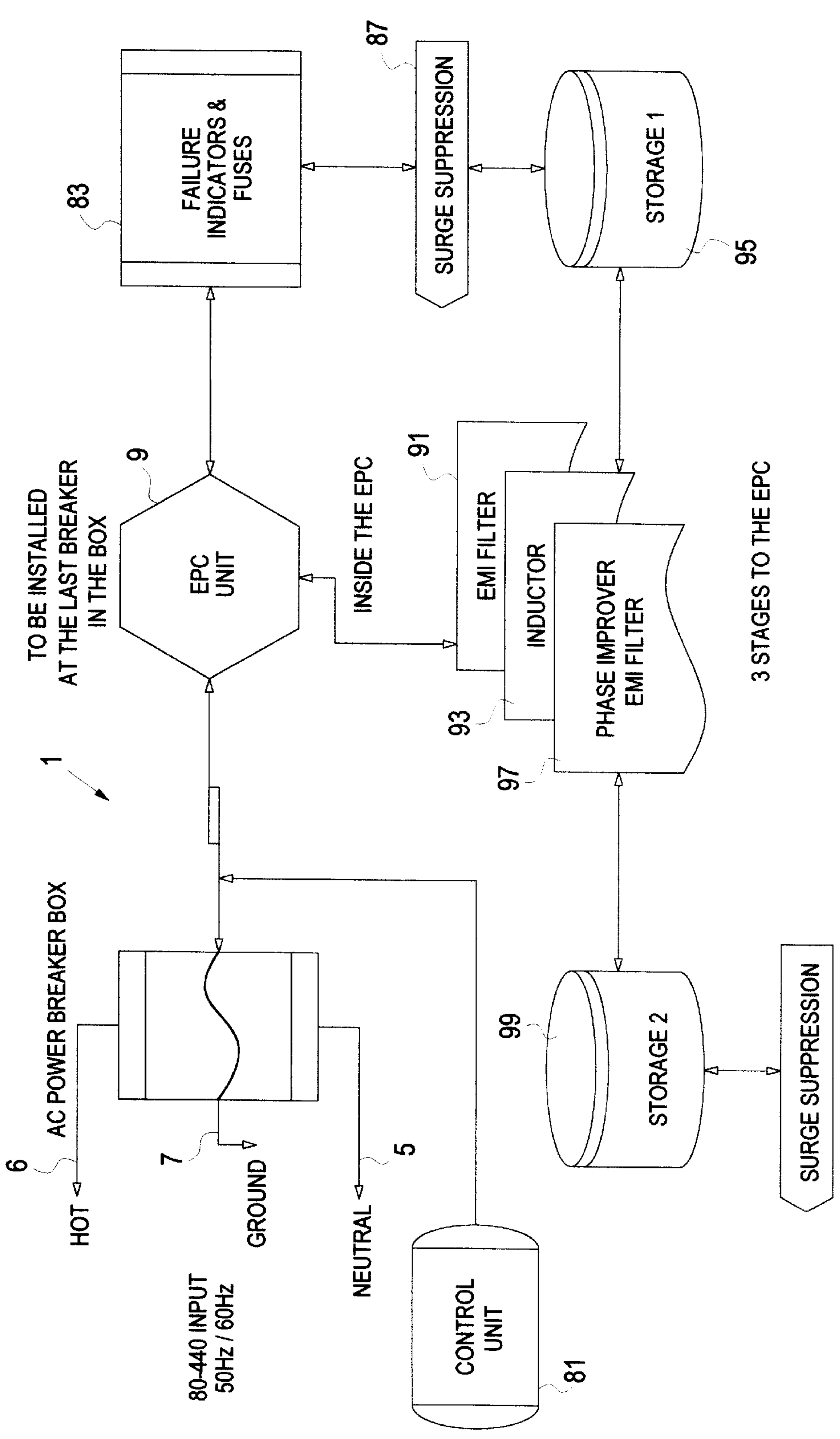
FIG. 1 shows a flow chart of one preferred embodiment of the power pod controller system of the present invention in symbolic form.

In a normal electrical power consumption situation, electricity is transmitted through power lines or transmission lines to a facility, e.g. the home, office, factory or other consumers, wherein the main line is typically connected to an electrical meter, and from the meter to a main breaker box (or, in earlier times, a main fuse box). Within the main breaker box, the main power line is connected to a plurality of individual circuit breakers which then lead to various power consumption devices such as heating, air conditioning, lighting and electrical outlets. While this arrangement works adequately to provide electrical power to the consumer, it is inefficient because many electrically powered devices and appliances consume more power than necessary and, additionally, they experience spikes, surges and phase shifts, which make the overall system inefficient and uneconomic.

The present invention relates to systems which are retrofitted to existing electrical power arrangements or are included in new installations for the purpose of reducing unnecessary electrical power waste and losses by reducing or eliminating spikes, surges and phase problems. It is a totally self-sufficient device which is attached downstream from or at the last breaker of the system or the last breaker to be regulated. It also includes failure indication circuitry to provide preset responses to failures, as well as lightning suppressors. These lightning suppressors are desirably arranged in parallel to suppress the type of major spikes caused by lightning.

A spike is a short pulse of energy with voltage as high as 6,000 volts and a duration of only a few milliseconds. The most common source of severe voltage spikes is nearby lightning strikes, though less sever-yet still potentially damaging-spikes can be caused by failures in the power grid or most likely from other local appliances. Voltage spikes often contain enough energy to cause immediate damage to sensitive solid state equipment as well as data loss in digital equipment. Over the long term, spikes can have serious cumulative effects such as fouling of switch contacts, degradation of wiring insulation, and unexplained behavior in silicon based equipment. These long-term effects can range from occasional annoyance to unexpected catastrophic failures. Mild spikes are unlikely to cause damage, but can generate audible pops or clicks.

Compared to the spike, a voltage surge is a less intense but longer-lasting event. A surge has a voltage increase of 15% to 45% and lasts from about 10 ms to several minutes. Voltage surges are common when using power supplied by generators, and surges also can be caused by temporary anomalies such as open neutral lines or shorts between high and low voltage distribution lines. The dangers of surges are similar to those of spikes, with the likelihood of serious consequences increasing with the intensity and duration of the surge.

Sags, on the other hand, are brief voltage drops, and are caused by many of the same conditions as spikes and surges.

Historically, metal oxide varistors have a number of advantages as protection devices, including good response time (typically about 15 nanoseconds), high current capability, small size, relatively low cost, and low standby power consumption. MOVs are rated according to their energy-handling capacity, specified in joules. The joule rating indicates how much energy can be dissipated before overheating is likely to cause degradation or failure of the MOB. Some devices have an indicator that shows MOV overload may have occurred (often triggered by a fuse in series with MOV), which means the MOV (or the entire device, if inexpensive) or fuse must be replaced.

Power protection devices on the market today carry joule ratings anywhere from less than 80 to more than 500. The higher the joule rating, the better all other factors being equal.

However, total joule ratings are not the only consideration in evaluating a protective device. While it is true that more joules can increase the likelihood of a device withstanding a powerful event, very few events are catastrophic in nature, and the best protection will be a balance between joule rating, RF (EMI and RFI) protection, and other features. Additionally, when as in the present invention, a second stage of MOV protection is added, it will be most effective if a filter is placed between it and the first stage of protection. Also, for the highest levels of protection in the present invention, other complementary suppression components are added to supplement the action of the MOVs, as detailed above and below.

Regarding reliability and useful life, in the present invention, a high quality (20 nim diameter or larger) MOV is used and it is an exceptionally rugged and long-lived component that is designed to withstand repeated, high intensity transient events. The IEEE Standard Test Pulse is designed to stimulate a worst case exposure from a nearby lightning strike at an interior AC receptacle. (The test pulse is 6 kV open circuit, 500 A maximum current for 20 ns). Modern MOVs are designed to withstand a minimum of 500 surges of this intensity, which is equivalent to a direct lightning strike on a power pole immediately outside your facility. For the more typical transient of 100 A, the rated life is more than 100,000 surges.

The present invention system described herein will reduce the harmonics in a building, maintaining the THD to 0.99 for the power factor correction, and having a line transient voltage surge suppressors (TVSS) that can be portable, mobile, or hard wired for the protection of homes controls and electronics, telecommunication, commercial and industrial controls and computer related equipment in such buildings. Thus, it will reduce the demand on a building and lower the energy used.

The present invention system acts as a parallel ac power sponge system that will provide a balanced ac load to the potential electrical feed to ones building or power supplied by the utility company be means of an electrical enclosure with it's electrical parts. By being in parallel to main load, the unit is connected to the source by connecting the unit at the end of the trunk-line of the power distribution unit and performs as a sponge to the electrical spikes and is corrects the poor power factor and the (Total Harmonic Distortion) to the electrical power. This method is used by the unit in parallel in which the unit will put the phase angle of the voltage and the current in phase. By having the power distribution system (circuit breakers) in front of all problems due to the demands, the present invention system provides means of acting on the end of the trunk line of the power parallel EPC (Electricity Pod Controller) unit box to reduce the consumption of power and reduce noise to the lines. The unit will respond to the demand and at a given demand flatten out the current by its storage devices and adjust on the voltage to current demands by giving the insulation a supply, which results in lower demand on power usage.

As mentioned above, the unit has basic a three part system that makes up the units, in the first stage, the EMI/TVSS section for all suppressors needed for a incoming voltage spike, then the second stage acts as a variable inductor to handle the THD, Power Factor of the line, the last stage will have a reserve storage to keep the unit in phase to the line and smooth out any unwanted noise and keep the phase relationship between the voltage and currents in true phase when a large demand is wanted. Thus, improvement is made by a 10% to 30% reduction to the line source and a savings of electricity costs accordingly.

The Electricity Pod Controller of the present invention involves a lowering of KWH, energy usage, and the demand rate applied. Testing has shown that energy saving will occur by having the kilowatt hours lowered and by having a very good power factor on the outgoing line, and having a steady >0.98 Power Factor to the incoming source.

A partial explanation of the present invention system is as follows:

When inductors are placed in parallel to a giving load, Total Inductance (LT) is equal to the reciprocal of the sum of the reciprocals of each of the inductive loads in a building. Like 1/LT=(1/L2+1/L3+etc.). In a reciprocal equation, the sum (Total Inductance LT) in this case, will always be smaller than the smallest term (LN) in the equation. Therefore, to reduce the Total Inductance, one would add, in parallel, and inductor with the small than any of the existing values. By changing the value of the Total Inductance (LT), it's possible to change the value of the inductive reactance by (XL). Inductive reactance, which measures the combined effect of the inductance, will be effected in the two ways by the EPC unit of the present invention. With its 60 Hz of 50 Hz filter, it reduces the frequency component of the inductive reactance equation by lowering the Total Current content including harmonic currents and 2 reduces LT by placing a sponge indicator in parallel to the circuit loads. XL=2 pie FL. Having reduced the Total Inductive reactance (XL), the Total Impedance (Z) will be reduced accordingly to the load required. Z=Square route of R2+XL2. The value of the (R) resistance is constant for a given power unit, therefore the value of (XL) is the predominant variable in the equation. The impedance can now reduce the power unit in phase and it will operate at a much greater efficiency, with a less energy consumed by the building. The unit will maximize the transfer of power, which will reduce noise and harmonics on the incoming lines, balance the loads phase to phase and phase to neutral, thereby increasing the overall circuit efficiency.

FIG. 1 illustrates a flow chart of one embodiment of an electricity pod controller of the present invention in symbolic representation. The diagram shows a flow chart 1. It includes connections to the breaker box including hot wire 3 and neutral wire 5. There is also a ground 7. The electricity pod controller unit 9, to be most efficient, is installed at the last breaker in the box of a facility in order to act upon all of the power flowing into the facility through those breakers.

Electricity pod controller unit 9 is shown to contain an electromagnetic interference filter 91, an inductor 93 with storage 95 for surge suppression, and a phase improving EMI filter 97 with storage 99, also for surge suppression. This is designed to operate within the preferred range of 80 to 440 volts or even a broader range of 25 to about 500 volts of AC input at 30 to 80 kiloHertz. In addition, there is a circuitry and panel for failures and fuses 83, functionally connected to unit 9 and the surge suppression feature 87 of inductor 93.

Figure 2:
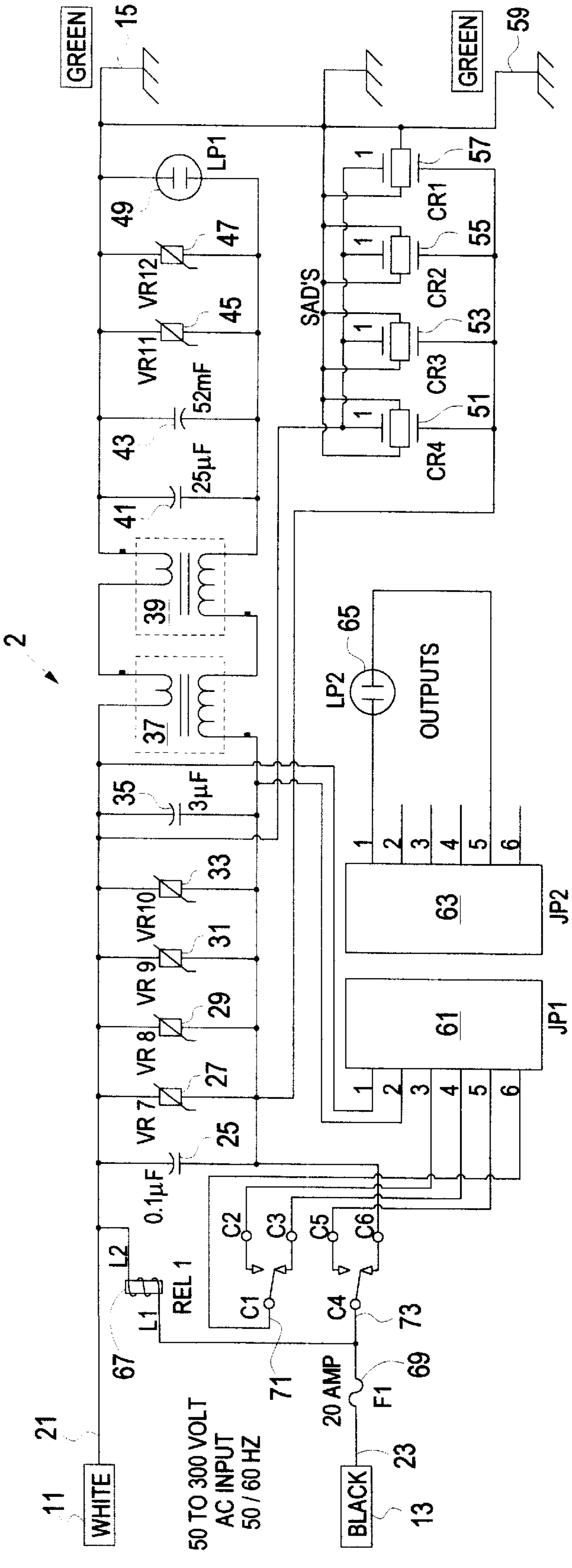
FIG. 2 shows a wiring diagram of one preferred embodiment of the present invention system for single phase operation.

FIG. 2 shows a wiring diagram of one preferred embodiment of the present invention power pod controller system for single phase operation. There is a white contact 11 and a black contact 13 with ground 15 as shown. For simplicity, the various components are shown and are described as being wired between neutral line 21 and hot line 23 and are described sequentially herein in an order beginning at the connections 11 and 13 and moving outwardly or away from those connections.

Thus the components in the wiring diagram of FIG. 2 represent a single phase device and include a surge suppression-type capacitor 25 (in this case, 0.1 microfarads and in general about 0.001 to 1.0 microfarads) followed by a plurality of varistors 27, 29, 31 and 33. These act together as a surge suppressor and could be replaced by other equivalent combinations or configurations of varistors. Collectively, they have a capability of 80,000 joules (i.e. about 20,000 joules each) and preferably should be in the range of 10,000 to 20,000 or more joules. Dry film capacitor 35, in this case, has a capacity of 3 microfarads. This is followed by two chokes or transformers functioning as inductor/metal oxide varistor transformers. They each are set to operate at about 40 to 60 millihenries. Next, are liquid filled high intensity discharge capacitors 41 and 43 rated at 25 microfarads and 52 millifarads, respectively. Varistors 45 and 47 act together as back end surge suppressors. There is an optional lamp 49 which remains illuminated while device 2 is hooked up and functional, and which shuts down if device 2 is non-functional, a component fails, or the device is disconnected. (This is also the case for the similarly located lamps described in conjunction with FIGS. 3 and 4 below.)

Also shown in FIG. 2 are SADs (silicon avalanche diodes) shown as lightning arresters 51, 53, 55 and 57. These are connected in parallel with surge suppressor set of varistors 27, 29, 31, and 33, as shown. The SADs are grounded by ground 59. Also, plug mates 61 and 63 are provided for connection to one or more of alarm lamps 65 to signal a failure. Failure signals are driven by switches 71 and 73 and relay 67 when other components in the system fail and cause unwanted (excess) power flow into the facility, i.e. when voltage exceeds a preset limit. Likewise, fuse(s) 69 is provided to also include another level of protection.

Figure 3:
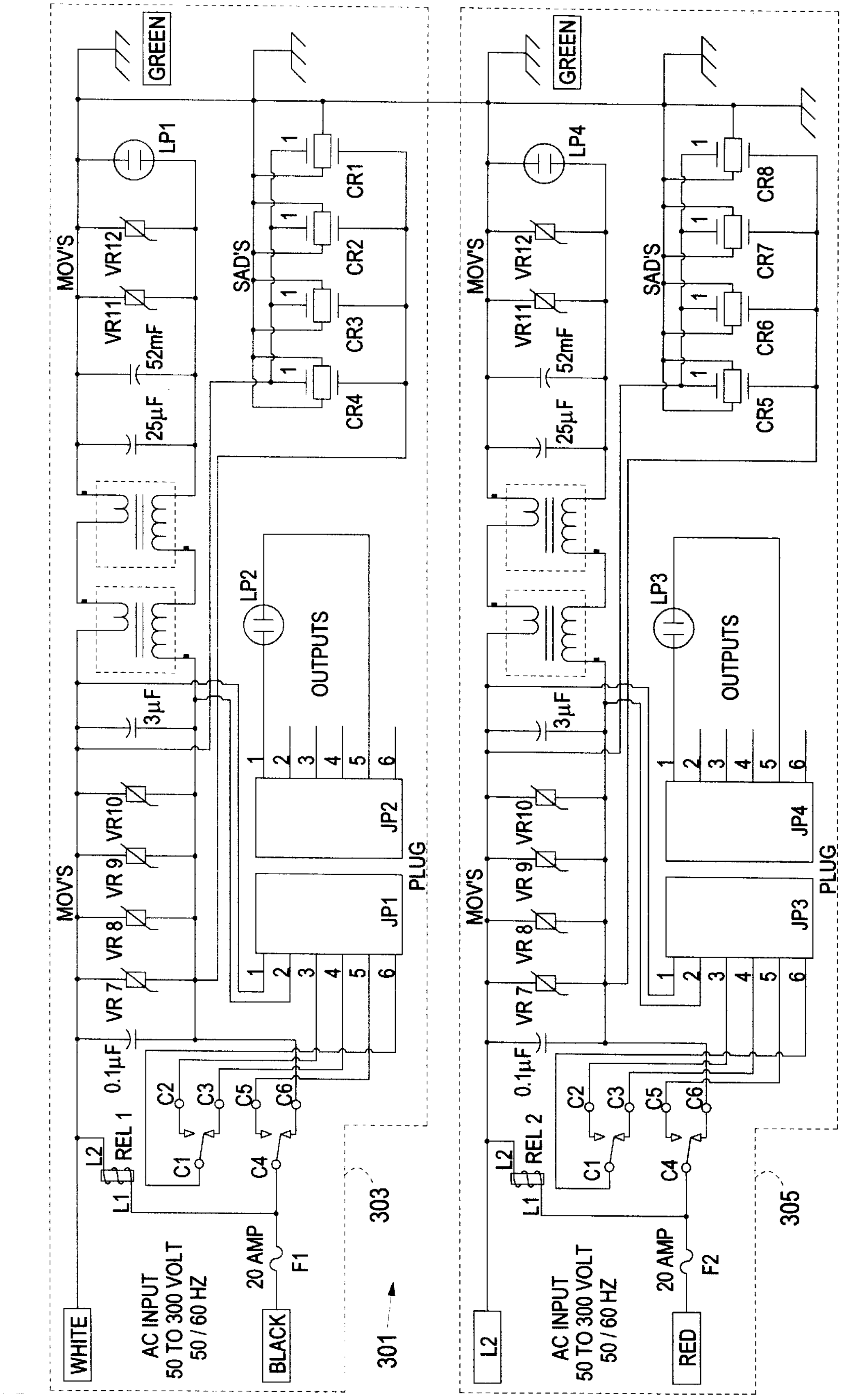
FIG. 3 illustrates a wiring diagram for another preferred embodiment of the present invention system for two phase operation; and, FIGS. 4*a* and 4*b* show a wiring diagram of yet another preferred embodiment of the present invention power pod controller system for three phase operation.

FIG. 3 shows another wiring diagram for a two phase present invention device 303 which includes duplicate subsystems 303 and 305, connected as shown. Each of these subsystems is identical to the entire system 2 as shown in FIG. 2 above. Thus, subsystem 303 and subsystem 305 have both identical components to the system 2 of FIG. 2 and each component has identical values thereto. This particular embodiment is used in a two phase environment.

Figure 4A:
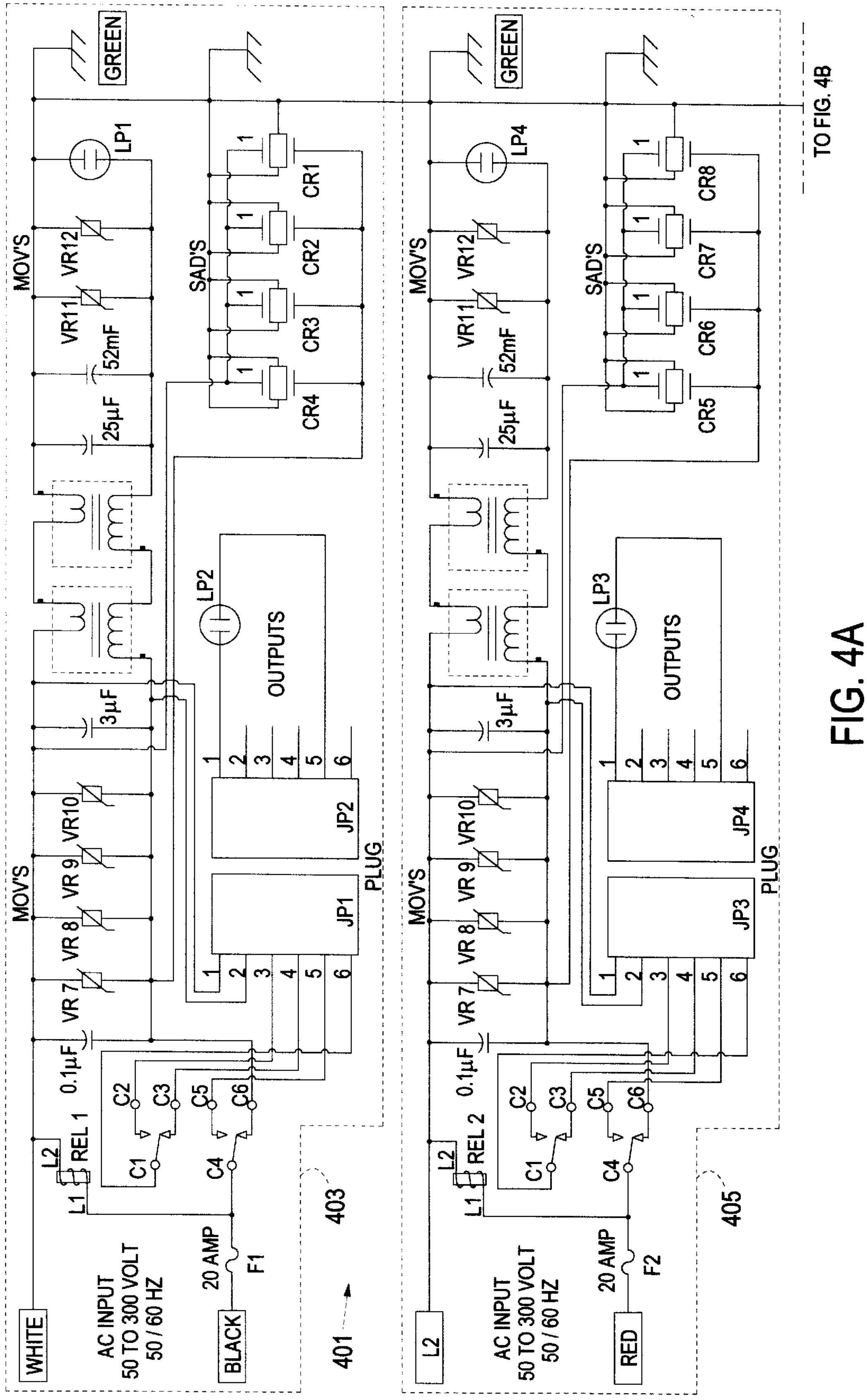
Figure 4B:
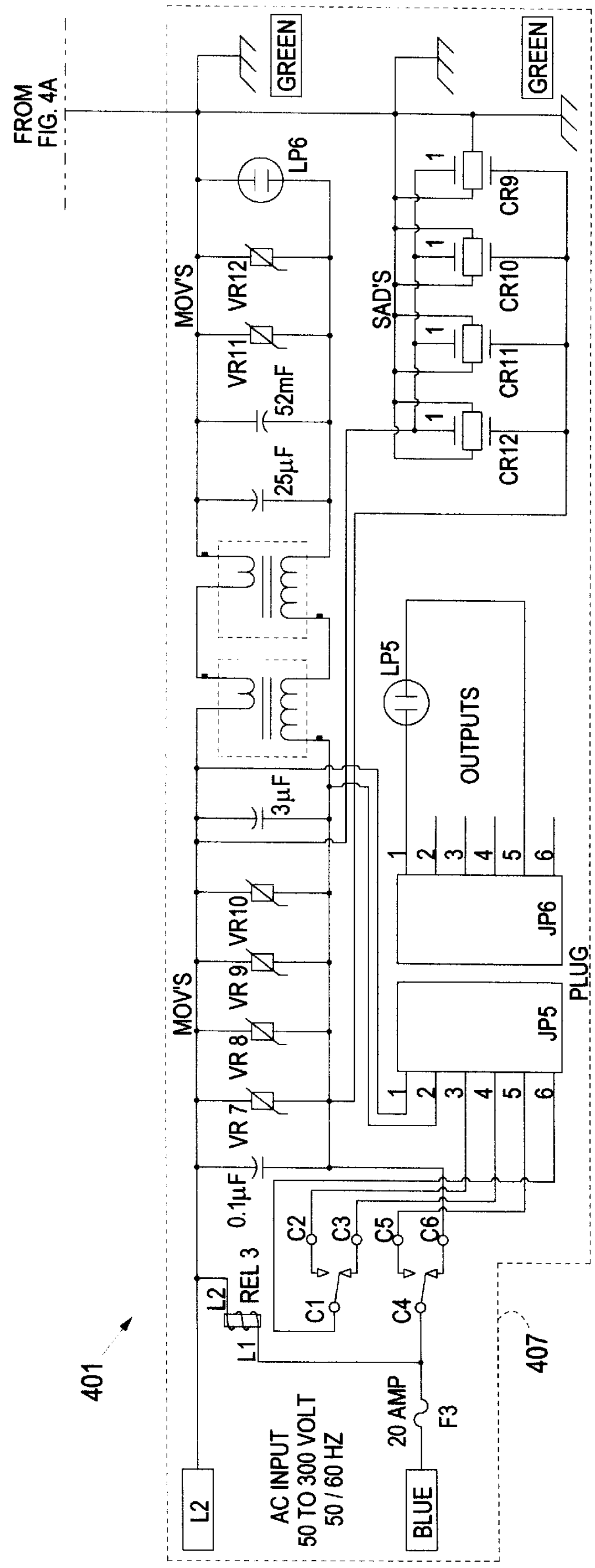

FIGS. 4*a* and 4*b* illustrate a wiring diagram for a three phase present invention system which includes three separate subsystems or arrays 403, 405 and 407. These are also each identical to the system 2 shown in FIG. 2, except that subsystem 405 is less one ground. The subsystems are connected to one another as shown. These three phase systems of the present invention may be utilized as shown with any three phase configuration (e.g. y-type three phase and delta-type three phase systems).

Obviously, numerous modifications and variations of the present invention are possible in light of the above teaching. It is therefore understood that within the scope of the appended claims, the invention may be practiced otherwise than as specifically described herein.

What is claimed is:

1. A power pod controller system, which comprises:

I.) connection means for connecting said system in parallel electrical connection with an incoming power supply to a facility;

II.) an electricity power controller device, which includes:

(b) a first stage component, including identifying means to recognize electromagnetic interference, and means to respond thereto by suppressing line transient voltage surges, said first stage component also including at least one line transient voltage surge suppressor (TVSS);

(c) a second stage component, including at least one variable inductor to regulate the total harmonics distortion (TED) and thus enhance power factor correction; and, (d) a third stage component, including means to provide power to maintain phase regulation to incoming power, thus, to maintain true phase relationship between voltage and current at times of increased power demands, said third stage component including at least one power storage and discharge means; and, III.) a failure indicator circuit connected to said electricity controller pod device TVSS, including at least one relay, one voltage-surge responsive switch and one indicator signalling component.

2. The system of claim 1 wherein said first stage component, second stage component and third stage component operate in a single phase.

3. The system of claim 1 wherein there are at least two sets of components, each set having said first stage component, said second stage component and said third stage component, wherein said system operates as a two phase system.

4. The system of claim 1 wherein there are three sets of components, each set having said first stage component, said second stage component and said third stage component, wherein said system operates as a three phase system.

5. A power pod controller system, which comprises:

(a) connecting means for connection to an incoming power supply of a facility, for connection in parallel, including a hot line and a neutral line, and at least one ground, and having the following components connected between said hot line and said neutral line, in the following order:

(b) at least one front metal oxide varistor line transient voltage surge suppressor having a predetermined number of joules capability to suppress undesired power spikes;

(c) at least one capacitor of predetermined capacitance;

(d) at least two chokes in the form of inductor/metal oxide varistor transformers;

(e) at least a second capacitor of its own predetermined capacitance;

(f) at least one back metal oxide varistor having a predetermined number of joules capability; and, (g) a failure indicator circuit connected to said transient voltage surge suppressor, including at least one relay, one voltage-surge responsive switch and one indicator signalling component.

6. The system of claim 5 which further includes at least one indicator lamp connection and lamp wired so as to illuminate when said device is functional and to not illuminate when said device is non-functional.

7. The system of claim 5 wherein said at least one front metal oxide varistor is a plurality of varistors in parallel.

8. The system of claim 5 wherein said at least one back metal oxide varistor is a plurality of varistors in parallel.

9. The system of claim 5 wherein said components (b) through (g) are arranged for operation as a single phase device.

10. The system of claim 9 wherein said at least one front metal oxide varistor is a plurality of varistors in parallel.

11. The system of claim 9 wherein said at least one back metal oxide varistor is a plurality of varistors in parallel.

12. The system of claim 5 wherein at least said components (b) through (g) are duplicated therein to form two connected sets of subsystems and are arranged for operation as a two phase system.

13. The system of claim 12 wherein said at least one front metal oxide varistor is a plurality of varistors in parallel.

14. The system of claim 12 wherein said at least one back metal oxide varistor is a plurality of varistors in parallel.

15. The system of claim 12 wherein at least a portion of component (e) is duplicated.

16. The system of claim 5 wherein said components (b) through (g) are at least triplicated therein to form three connected sets of subsystems and are arranged for operation as a three phase system.

17. The system of claim 16 wherein said at least one front metal oxide varistor is a plurality of varistors in parallel.

18. The system of claim 16 wherein said at least one back metal oxide varistor is a plurality of varistors in parallel.

* * * * *